US011891195B2

(12) United States Patent
Effler et al.

(10) Patent No.: US 11,891,195 B2
(45) Date of Patent: Feb. 6, 2024

(54) MITIGATING DAMAGE TO MULTI-LAYER NETWORKS

(71) Applicant: The Boeing Company, Chicago, IL (US)

(72) Inventors: Richard A Effler, O'Fallon, MO (US); Alexander S. Burch, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 17/377,281

(22) Filed: Jul. 15, 2021

(65) Prior Publication Data
US 2022/0033110 A1 Feb. 3, 2022

Related U.S. Application Data

(60) Provisional application No. 63/058,163, filed on Jul. 29, 2020.

(51) Int. Cl.
G06N 3/08 (2023.01)
G06F 18/214 (2023.01)
B64G 1/54 (2006.01)

(52) U.S. Cl.
CPC ........... B64G 1/546 (2013.01); G06F 18/214 (2023.01); G06N 3/08 (2013.01)

(58) Field of Classification Search
CPC .......... B64G 1/546; G06F 18/214; G06N 3/08
See application file for complete search history.

(56) References Cited

U.S. PATENT DOCUMENTS

| 10,163,197 | B2 * | 12/2018 | Kulkarni | G06N 3/084 |
| 10,877,634 | B1 * | 12/2020 | Sica | G06V 10/82 |
| 11,574,143 | B2 * | 2/2023 | Lin | G06V 20/52 |
| 2016/0307098 | A1 * | 10/2016 | Goel | G06N 3/045 |
| 2018/0107928 | A1 * | 4/2018 | Zhang | G06N 3/082 |

(Continued)

FOREIGN PATENT DOCUMENTS

| EP | 3065376 B1 * | 9/2017 | H04L 41/12 |
| WO | WO-2017201511 A1 * | 11/2017 | G06N 3/0445 |

(Continued)

Primary Examiner — Matthew M Kim
Assistant Examiner — Indranil Chowdhury
(74) Attorney, Agent, or Firm — Jordan IP Law, LLC

(57) ABSTRACT

Software-based solutions may mitigate physical damage to multi-layer networks, such as neural networks having shortcut (residual) connections. An example includes: providing a multi-layer network comprising a plurality of nodes; for each of a plurality of training cases: determining a set of dropout nodes, based at least on a damage model having a probability of a node being selected for dropout that is based at least on a target operating environment of the multi-layer network, wherein the probability of a node being selected is spatially correlated; and training the multi-layer network with the determined set of dropout nodes disabled (with a different set of dropout nodes for different training cases). In some examples the damage model involves expected physical radiation damage to a computing device hosting the multi-layer network, such as on board an aircraft or an earth-orbiting satellite. Thus, multiple degrees of expected damage may be addressed.

20 Claims, 10 Drawing Sheets

(56) References Cited

U.S. PATENT DOCUMENTS

| | | | |
|---|---|---|---|
| 2018/0158181 A1* | 6/2018 | Kulkarni | G06V 10/764 |
| 2019/0095794 A1* | 3/2019 | Aldana López | G06N 3/084 |
| 2019/0220748 A1* | 7/2019 | Denil | G06N 3/044 |
| 2019/0347558 A1* | 11/2019 | Hinton | G06N 3/082 |
| 2019/0392071 A1* | 12/2019 | Rao | G06N 20/00 |
| 2020/0234110 A1* | 7/2020 | Singh | G06N 3/08 |
| 2021/0117774 A1* | 4/2021 | Choi | G06N 3/045 |
| 2021/0232860 A1* | 7/2021 | Liu | G06F 18/214 |
| 2022/0027668 A1* | 1/2022 | Rhee | G06N 3/04 |
| 2022/0156563 A1* | 5/2022 | Zhang | G06F 18/214 |
| 2022/0180191 A1* | 6/2022 | Burch | G06N 3/08 |
| 2022/0238031 A1* | 7/2022 | Evans | B64C 39/024 |
| 2022/0292356 A1* | 9/2022 | Singh | G06F 21/577 |
| 2022/0296923 A1* | 9/2022 | Peltola | A61N 5/103 |
| 2023/0162039 A1* | 5/2023 | Gupta | G06N 3/048 |
| | | | 706/20 |

FOREIGN PATENT DOCUMENTS

| | | | |
|---|---|---|---|
| WO | WO-2023097392 A2 * | 6/2023 | |
| WO | WO-2023156620 A1 * | 8/2023 | |

* cited by examiner

● = 300      ○ = 320

MITIGATING DAMAGE TO MULTI-LAYER NETWORKS

CROSS-REFERENCE TO RELATED APPLICATION

This application claims the benefit of and priority to U.S. Provisional Application No. 63/058,163, entitled "MITIGATING DAMAGE TO MULTI-LAYER NETWORKS", filed Jul. 29, 2020, which is incorporated by reference herein in its entirety.

BACKGROUND

Radiation damage to sold state electrical components poses a threat in many aerospace applications, such as high-altitude aircraft, earth-orbiting satellites, and deep space probes. For example, radiation may corrupt data in memory and processors damaging onboard computing equipment and the programs they contain. Traditional solutions focus on using redundant hardware to compensate for the expected damage, for example using voting from a plurality of different hardware systems. That adds cost and complexity, and weight to aircraft and spacecraft. Other solutions include fortifying chipsets to be radiation hardened. This requires fabricating special chipsets and adds cost.

Recent advances in computing hardware have allowed new applications in edge computing relating to machine learning and neural networks. Unfortunately, the classic problem of radiation damage to such systems remains, and the traditional solutions may introduce excessive cost and complexity. Thus, neural networks remain susceptible to errors when deployed and operated in the presence of radiation.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples provided herein include software-based solutions that may mitigate physical damage to multi-layer networks, such as neural networks having shortcut (residual) connections. An example includes: providing a multi-layer network comprising a plurality of nodes arranged into a plurality of layers; receiving a plurality of training cases for training the multi-layer network; and for each training case of the plurality of training cases: determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases. In some examples the damage model involves expected physical radiation damage to a computing device hosting the multi-layer network, such as on board an aircraft or an earth-orbiting satellite. Thus, multiple degrees of expected damage may be addressed.

The features, functions, and advantages that have been discussed are achieved independently in various examples or are to be combined in yet other examples, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings in accordance with an example.

DETAILED DESCRIPTION

Figure 1:
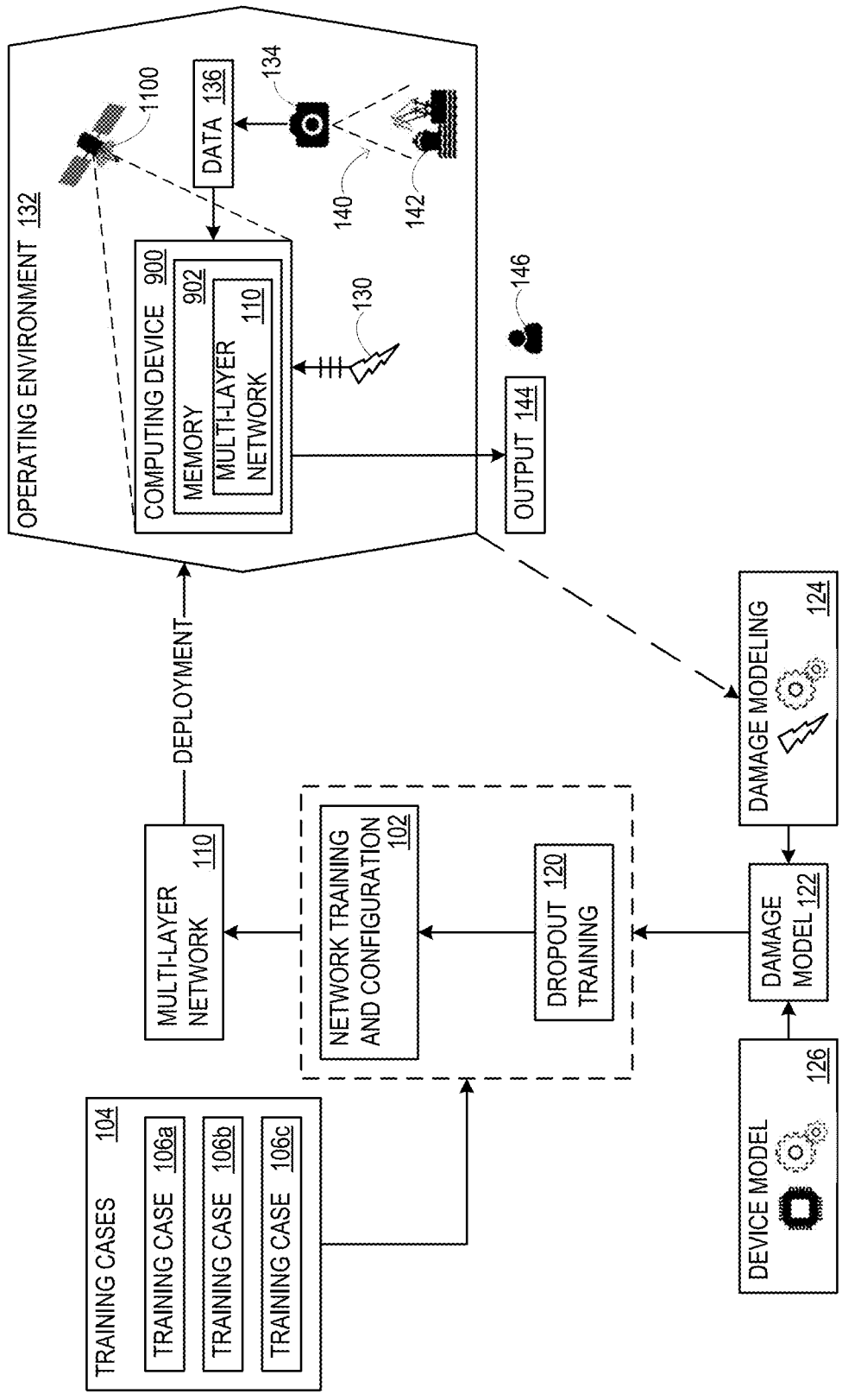
FIG. 1 illustrates an arrangement 100 that advantageously mitigates damage to multi-layer networks, for example a multi-layer network 110 in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" or "one example" are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects of the disclosure are able to advantageously train multi-layered networks to be sufficiently robust for use in inhospitable operating environments in which radiation may cause degradation of computing devices—and in which traditionally trained multi-layered networks may be more prone to failure. Aspects of the disclosure present novel solutions in which software-based approaches may be used to mitigate the effects of physical radiation damage to platforms during flight. By minimizing the effects on the chosen network, performance loss associated with radiation will also be minimized, thus allowing the system to be used in environments otherwise too inhospitable for traditional multi-layer networks and/or commercial-off-the-shelf (COTS) computing hardware.

Dropout training, which has historically been used to reduce the possibility of overfitting of neural networks (by dropping out random nodes during the training process) is serendipitously at least somewhat similar to the effect of physical radiation damage that may be expected to occur to a computing device that is hosting a neural network in certain operating environments. Therefore, aspects of the disclosure train a multi-layer network (e.g., a neural network) using drop-out in order to render the multi-layer network sufficiently robust so that, if radiation damage does affect the computing device such that certain nodes of the multi-layer network impaired, the impaired multi-layer network may continue functioning. This approach is able to increase the amount of available or usable data while reducing the amount of corrupted data as compared to traditional systems that do not employ such advantageous solutions described herein.

Notable differences in the dropout training, relative to historical uses, result from the different motivation. For historical uses, dropout training is to address overfitting, it may be limited to certain hidden layers in which overfitting is likely to occur, use uniform dropout probability for each node within the dropout layers, and be tailored to the specific training issues identified as overfitting. However, radiation damage may occur anywhere within a computing device. Therefore, aspects of the disclosure may involve dropout at any layer. Adding random data loss from drop out at any location during training of a network models the random data loss (resulting from damage) that could be experienced anywhere a network during operations in an inhospitable operating environment. In general, in order for neural networks to function well, they should be trained in a manner similar to how they will be used in operation. Therefore, if it is expected that during operation nodes will drop out due to physical radiation damage, the network should be trained to operate despite the loss of some nodes. This is provided by dropout training.

Additionally, because radiation damage is a physical phenomenon, when one node of a multi-layer network is damaged, other nodes located nearby (e.g., nearby within the physical memory device holding the multi-layer network), aspects of the disclosure include that the probability of a node being selected for dropout is spatially correlated. Thus, because physical radiation damage may result in clustered losses of nodes, aspects of the disclosure include the probability of dropout (during training) being spatially correlated so that the network learns to rely more heavily on spatially separated nodes. With this spatial correlation, the selection of a first node for being dropped out affects the probability of nearby nodes for also being selected for dropout. Further, the dropout training is tailored to (based at least on) the target operating environment of the multi-layer network. For example, earth-orbiting satellites are likely to experience more radiation damage than high altitude aircraft, but likely less than what may be encountered by a deep space, planetary, or solar probe.

Additional aspects of the disclosure leverage residual network techniques, such as shortcut connections, which may further mitigate the negative effects on a multi-layer network that could result from the loss of one or mode nodes. Similarly, to dropout having a historically different motivation, the history of residual network techniques is also different: training hold-up. For example, shortcut connections have historically been used to address the problem of vanishing gradients during training, in which gradients used for adjusting weights become so small that training effectively stalls. However, in the radiation damage problem, the shortcut connections increase the robustness of a multi-layer network by enabling signals to pass even when a layer is damaged. Thus, another solution to a training problem may be leveraged to improve performance reliability during use in an inhospitable operating environment.

Aspects and implementations disclosed herein are directed to software-based solutions that may mitigate physical damage to multi-layer networks, such as neural networks having shortcut (residual) connections. An example includes: providing a multi-layer network comprising a plurality of nodes arranged into a plurality of layers; receiving a plurality of training cases for training the multi-layer network; and for each training case of the plurality of training cases: determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases. In some examples the damage model involves expected physical radiation damage to a computing device hosting the multi-layer network, such as on board an aircraft or an earth-orbiting satellite. Thus, multiple degrees of expected damage may be addressed.

Referring more particularly to the drawings, FIG. 1 illustrates an arrangement 100 that advantageously mitigates damage to a multi-layer network 110. As illustrated, the arrangement 100 includes a network training and configuration component 102 that trains the multi-layer network 110 using a plurality of training cases 104 that includes at least a first training case 106a, a second training case 106b, and a third training case 106c. In one example, a different (e.g., larger) number of training cases is used. The multi-layer network 110 is then deployed and hosted on a computing device 900, which is described in further detail in relation to FIG. 9, within an operating environment 132 (on board an apparatus 1100). The apparatus 1100 is illustrated as an earth-orbiting satellite and is described in further detail in relation to FIG. 11. In one example, the network training and configuration component 102 and a dropout training component 120 (described below) are combined into a single component. Other examples are contemplated as described below.

Figure 2:
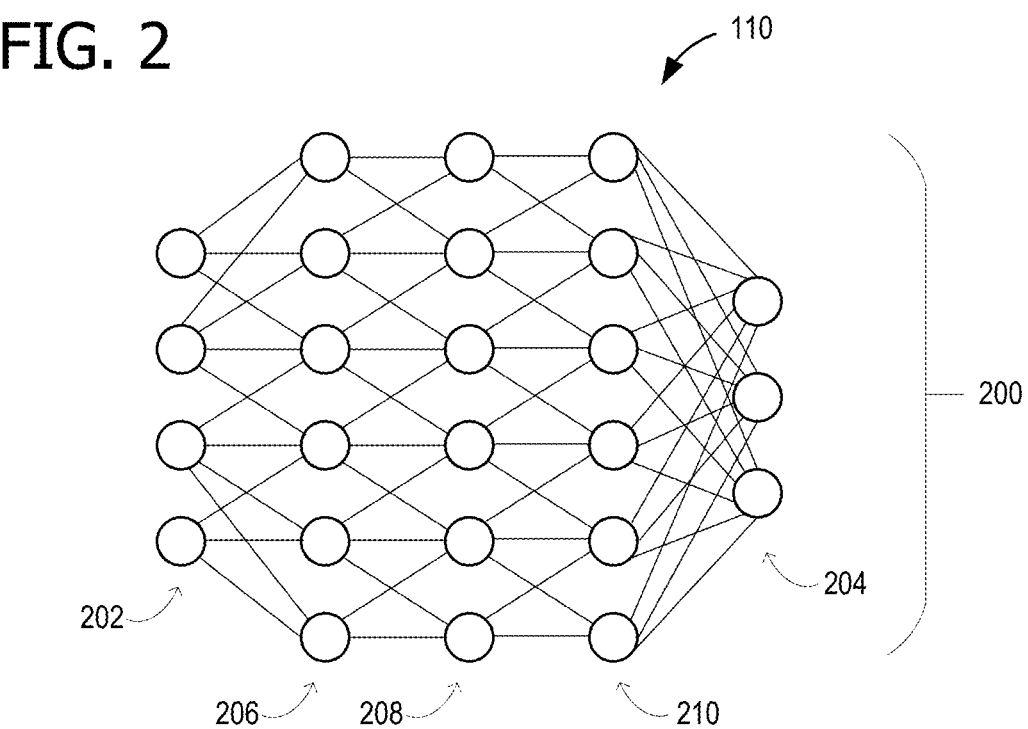
FIG. 2 illustrates an exemplary implementation of the multi-layer network 110 of FIG. 1 in accordance with an example.

Turning briefly to FIG. 2, the multi-layer network 110 is illustrated as a plurality of nodes 200 (e.g., neurons) arranged into a plurality of layers 202, 204, 206, 208, and 210. It should be understood that a different number of nodes and layers may be used in other examples. Layer 202 is an input layer, layer 204 is an output layer, and layers 206-210 are hidden layers. For clarity of illustration, not all connections among the nodes 200 are drawn. In an example, the multi-layer network 110 comprises data (e.g., nodes and weights) within a memory 902 and is implemented using computer executable instructions (e.g., instructions 902a) on the computing device 900. In one example, the multi-layer network 110 is a neural network. In one example, the multi-layer network 110 is a convolutional neural network (CNN). In one example, the multi-layer network 110 is able to perform image classification. In one example, the multi-layer network 110 is able to perform object recognition. Aspects of the disclosure may be applicable to other forms of multilayer networks, for example physical networks, and the damage may be other than radiation damage, but instead may be damage to networks via malicious logic (e.g., computer viruses) and/or hackers. That is, damage may be random loss of information for any reason, including cyber-attacks and computer viruses.

Returning to FIG. 1, the multi-layer network 110 is operated in the operating environment 132, which is the illustrated case is on board an earth-orbiting satellite (apparatus 1100). This is an inhospitable environment because the apparatus 1100 is susceptible to damage 130, such as high levels of radiation. The damage may be sufficiently severe to negatively impact traditionally trained neural networks. Other potential target operating environments 132 include: an aircraft, a solar probe, a planetary probe, and a ground-based environment with expected radiation exposure (e.g., a nuclear power plant).

However, a neural network may be desirable in certain inhospitable environments due to the performance offered by neural networks for tasks such as image classification and object recognition. As illustrated, a sensor 134 (e.g., a camera, infrared sensor, hyperspectral sensor, or a synthetic aperture radar) images a scene 140 that contains an object 142, such as a vehicle (e.g., a ship, as illustrated). Output of the sensor 134 becomes input data 136 that is received by the multi-layer network 110. Based at least receiving the input data 136, the multi-layer network 110 generates an output 144 for a user 146. In one example, the output 144 is image classification for the scene 140. In one example, the output 144 is recognition of the object 142.

Without a solution to render the multi-layer network 110 robust in the presence of the damage 130, performance of the multi-layer network 110 may degrade. Thus, a damage modeling operation 124 models the damage 130 that is expected within the target (planned) operating environment 132 of the multi-layer network 110. In one example, the resulting damage model 122 comprises expected physical radiation damage to the computing device 900 hosting the multi-layer network 110. In some scenarios, such radiation is Brownian (random). However, the radiation may impact a region of the physical memory 902 device. Thus, the probability of a node being damaged is spatially correlated. Based on using the damage model 122 for dropout training by the dropout training component 120, the probability of a node being selected for dropout will then be spatially correlated. In one example, the physical layout of the memory 902, and the physical placement of data representing the nodes 200 within the memory 902 is modeled with a device model 126, so that damage model 122 is able to identify nodes in different layers that are physically close to any particular node selected for dropout during training. In some scenarios, the damage is a virus (e.g., a computer virus or other malware) or a cyber-attack.

The dropout training component 120 uses the damage model 122 so that a network training and configuration component 102 may make advantageous use of the plurality of training cases 104. The training occurs on a computing device 900, which may be the same or a different computing device 900 as hosts the multi-layer network 110 in the operating environment 132. It should be noted that dropout is used intentionally for training, but in one example, the intent is that the multi-layer network 110 operates with all nodes. During operation, nodes being impacted by the damage 130 may be similar to dropout. Because the multi-layer network 110 had been trained to operate with deactivated nodes (e.g., dropout training), the multi-layer network 110 will be sufficiently robust to operate with impacted nodes.

Figure 3:
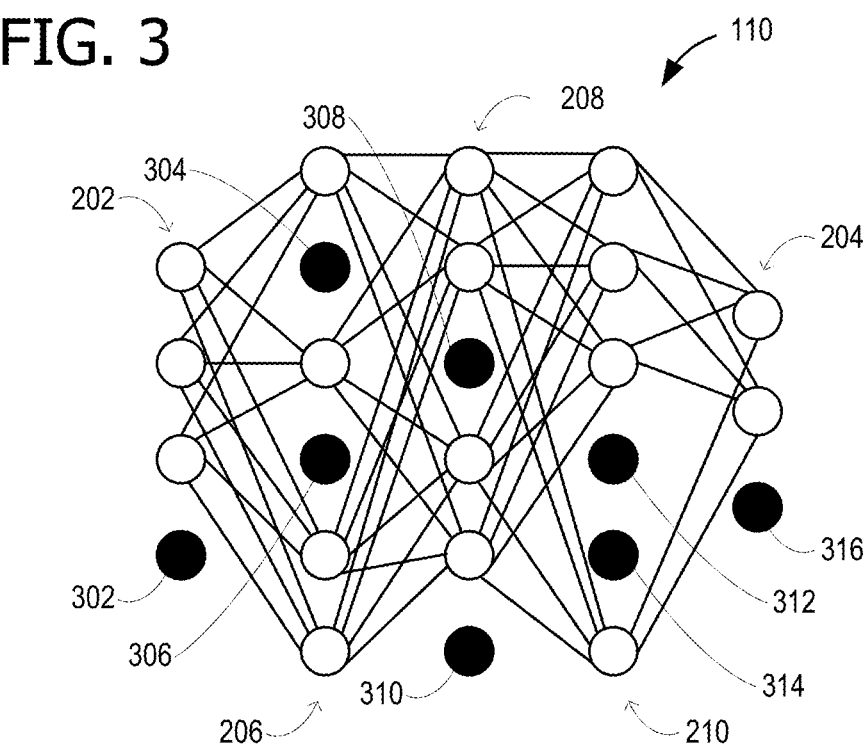
FIG. 3 illustrates the multi-layer network 110 of FIG. 2 during training with dropout in accordance with an example.

FIG. 3 illustrates the multi-layer network 110 during training with dropout. A set of dropout nodes 300 (the filled-in nodes) includes nodes 302-316. The remaining nodes are the set of active nodes 320. The set of dropout nodes 300 is determined within the multi-layer network 110, based at least on the damage model 122 having a probability of a node being selected for dropout that is based at least on the target operating environment 132 of the multi-layer network 110. As illustrated, nodes in each layer 202-210 are subject to dropout. That is, at least one node within each layer 202-210 of the multi-layer network 110 is dropped out. However, in some examples at least one node within each hidden layer 206-210 is dropped out, but nodes within the input layer 202 and/or the output layer 204 are not dropped out.

Dropout training includes training the multi-layer network 110 with the determined set of dropout nodes 300 disabled, wherein a different set of dropout nodes 300 is determined for different training cases 106a-106c. Once the training set (e.g., the plurality of training cases 104) has been learned, the dropout nodes 300 are turned back on and the weights are normalized. Normalization is used when weights are larger with dropout than they would be without (due to the reduced number of active nodes). In one example, normalization comprises reducing weights according to the probability that the node was not disabled. For example, if each node had a 0.5 probability of being disabled during training stage, the weights are halved because approximately twice as many nodes will be enabled during operations and testing. This normalization scheme is in addition to, and does not include, normalization required for using shortcut (residual) connections, which is described in relation to FIG. 6.

In one example, dropout probabilities are different between the input layer 202, the output layer 204, and the hidden layers 206-210. For example, the hidden layers 206-210 may have a higher dropout probability. In one example, dropout probabilities are different among the hidden layers 206-210. In one example, dropout is not used on the output layer 204. In one example, dropout is not used on the input layer 202. Adding random data loss from drop out at any location during training of the multi-layer network 110 models the random data loss (resulting from the damage 130) that could be experienced anywhere in the multi-layer network 110 during operations in the operating environment 132. In order for the multi-layer network 110 (and neural networks in general) to function well, they should be trained in a manner similar to how they will be used in operation.

Figure 4:
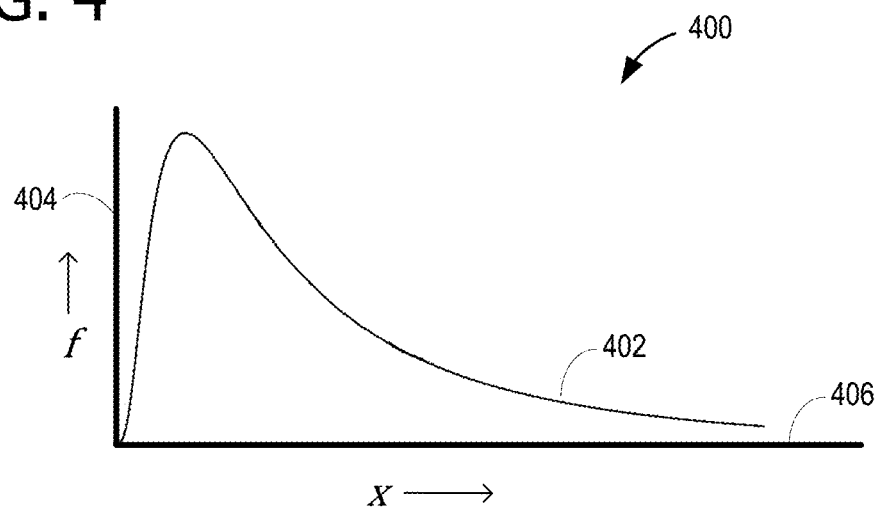
FIG. 4 is a plot 400 of a probability distribution function related to the drop-out illustrated in FIG. 3 in accordance with an example.

FIG. 4 is a plot 400 of a probability distribution function related to the drop-out illustrated in FIG. 3. In one example, the probability of a node being selected for dropout is spatially correlated and approximates an inverse Gaussian distribution. This selection scheme is used because when a high energy particle (e.g., a cause of the damage 130) strikes the memory 902, and there is corresponding data loss (e.g., data corruption), areas within the memory 902 that are close to the damaged area are more likely to also be damaged. By training the multi-layer network 110 to relying on nodes that are further away from the node immediately affected by the data loss, we decrease our probability of using corrupted or partially corrupted data when the multi-layer network 110 is used in operations in the operating environment 132 and does suffer the damage 130.

The plot 400 has an inverse Gaussian probability distribution function (also known as the Wald distribution) plotted as curve 402 with vertical axis 404 showing the value of the function $f$ for values of x >0 along horizontal axis 406. The function $f$ is given by:

$$f(x; \mu, \lambda) = \sqrt{\frac{\lambda}{2\pi x^3}} \exp\left(-\frac{\lambda(x-\mu)^2}{2\mu^2 x}\right) \quad \text{Equation 1}$$

where $\mu>0$ is the mean and $\lambda>0$ is the shape parameter. In the plot 400, $\mu$ and $\lambda$ are both set to the value 1.0. In one example, the damage modeling operation 124 will find different values of $\mu$ and $\lambda$.

Figure 5:
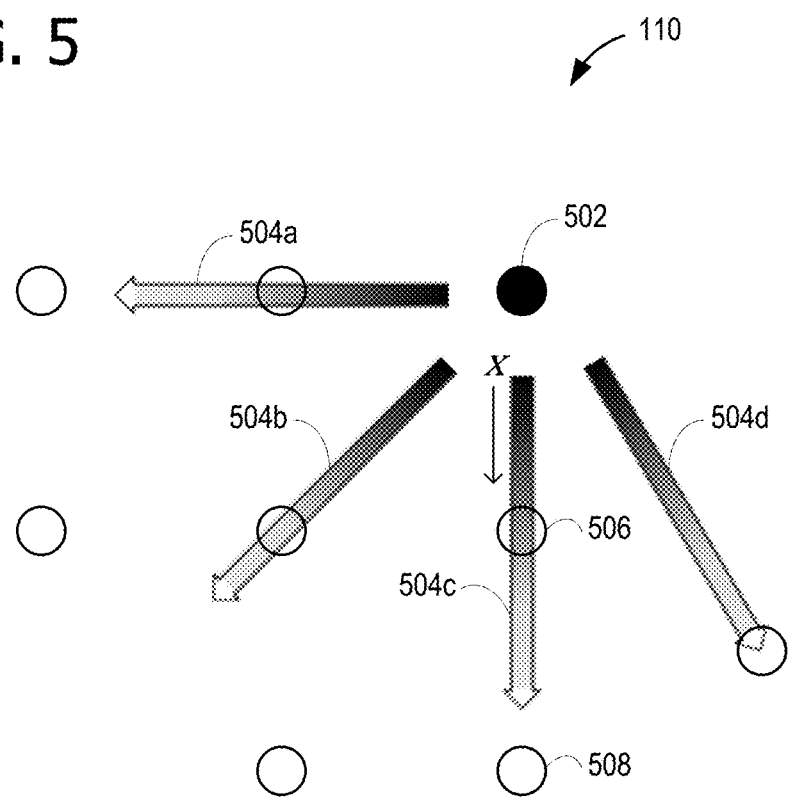
FIG. 5 illustrates spatial correlation of expected damage 130 to the multi-layer network 110 that may be expected when operating the multi-layer network 110 in target operating environment 132 of FIG. 1 in accordance with an example.

FIG. 5 illustrates spatial correlation of expected damage 130 to the multi-layer network 110 that may be expected when operating the multi-layer network 110 in the target operating environment 132 of FIG. 1. FIG. 5 shows a portion of the multi-layer network 110 (without connections) and a node 502 that is selected for dropout. The arrows 504a, 504b, 504c, and 504d indicate directions away from the node 502, and are filled in according to the value of the calculated probability. That is, each of the arrows 504a, 504b, 504c, and 504d represents a curve 402 in the direction indicated, with the degree of darkening indicating the value of the probability (darker gray being a higher probability value).

Following the arrow 504c, it can be seen that a node 506 will have a higher probability of being selected for dropout than a further node 508. Thus, the probability of a node being selected for dropout is spatially correlated. This increases (e.g., maximizes) the amount of available data while reducing (e.g., minimizing) the amount of corrupted data when the multi-layer network 110 is used for operations. The use of an inverse Gaussian distribution, as illustrated in FIG. 4, is one way to accomplish this, as it models the damage to nearby nodes in the vicinity of radiation damage (e.g., an impact by a high energy particle), and increases dependence on nodes that are farther away from the affected node. In one example, the selection probability includes a step function that models damage spanning more than a single node, thereby dropping out nodes within a particular distance.

In one example, the damage model 122 comprises an expected physical layout of the nodes of the multi-layer network 110 in the memory 902 of the computing device 900. This is indicated by the arrows 504a, 504b, and 504d spanning layers. Although FIG. 5 indicates that the nodes of the multi-layer network 110 are physically stored according to their representation within FIG. 5, it should be understood that FIG. 5 is a notional representation, and the physical proximity of node data within the memory 902 may not correlate to layers and the representations of the relative locations of the node positions in the attached figures. However, absent a device model 126, a first order approximation of distance will be node adjacency within a layer.

Figure 6:
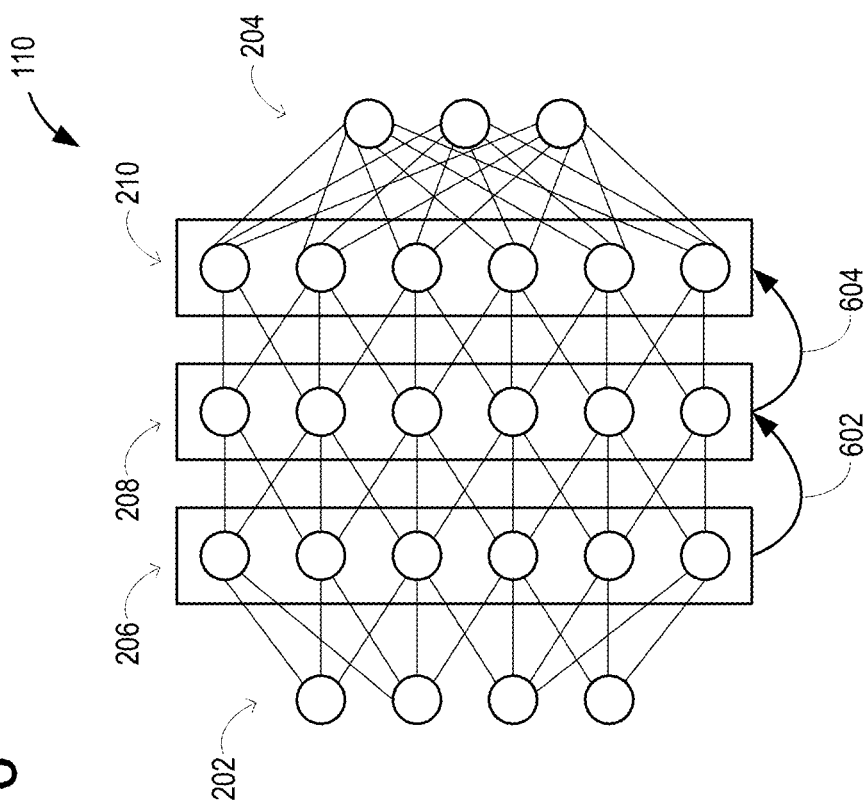
FIG. 6 illustrates shortcut (residual) connections 6xx that may be used within the multi-layer network 110 of FIG. 1 in accordance with an example.

FIG. 6 illustrates shortcut (residual) connections 602 and 604 that may be used within the multi-layer network 110 of FIG. 1. A Residual Neural Network (e.g., ResNet) is an example of a neural network that uses shortcut (residual) connections. Different redundant connection and shortcut connection architectures may work with aspects of the disclosure, based upon network depth (e.g., a network must have sufficient depth in order for shortcut connections to provide meaningful benefit). As shown, the multi-layer network 11 comprises at least one shortcut connection 602 (and 604) among different ones of the plurality of layers 202-210. Shortcut connection 602 takes the inputs to the nodes of the layer 206 and makes them available as additional inputs to the nodes of the layer 208. Similarly, shortcut connection 604 takes the inputs to the nodes of the layer 208 and makes them available as additional inputs to the nodes of the layer 210. Although each of shortcut connections 602 and 604 is shown as skipping one layer, in some examples, a different number of layers may be skipped. Because the shortcut connections add to the inputs of nodes, the weights among the nodes within the multi-layer network 110 may be adjusted in a normalization process. This normalization process will be in addition to the normalization used for adjusting for dropout.

Figure 7:
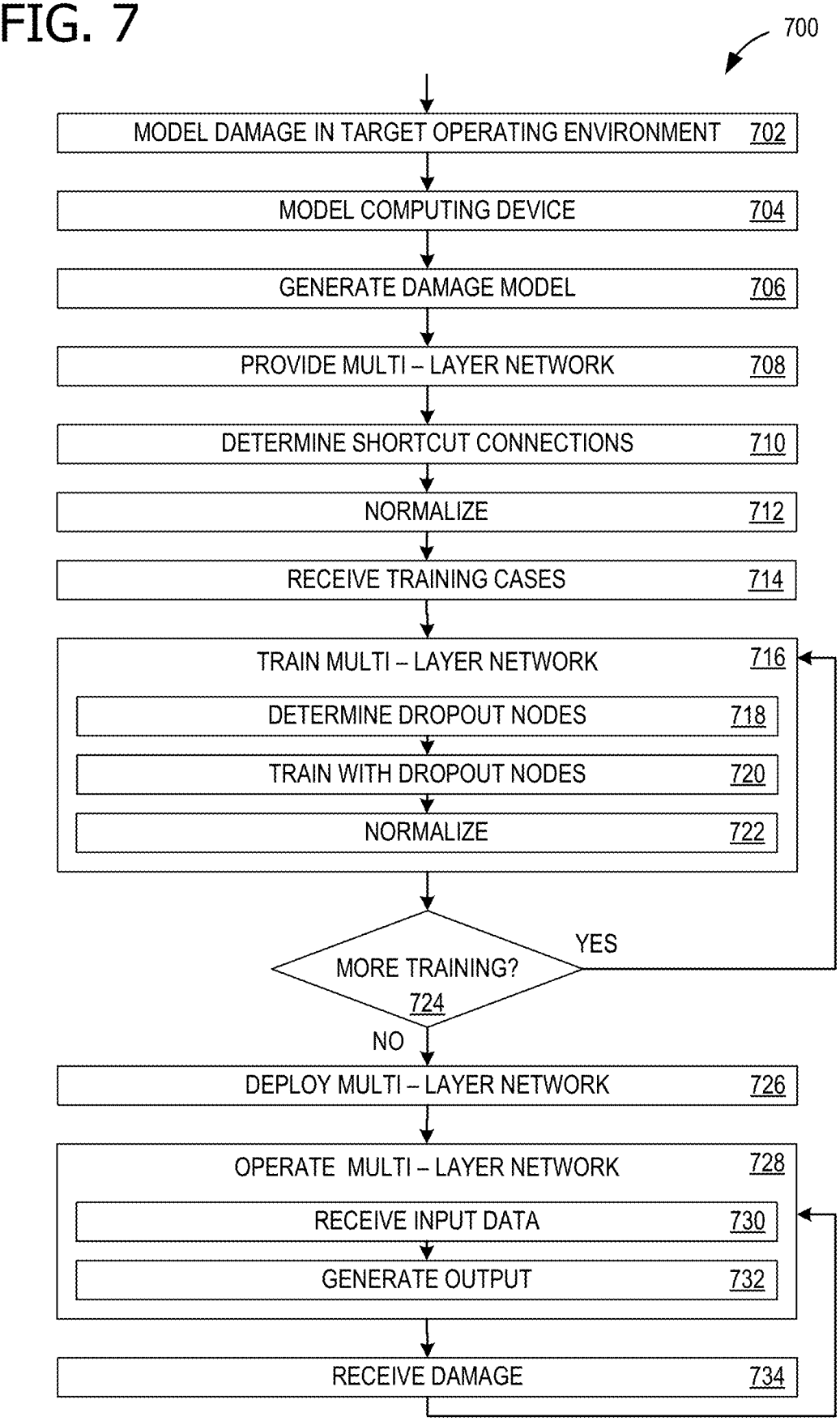
FIG. 7 is a flow chart 700 illustrating a method of mitigating damage to multi-layer networks, as may be used with the arrangement 100 of FIG. 1 in accordance with an example.

With reference now to FIG. 7, a flow chart 700 illustrates a method of mitigating damage to the multi-layer network 110. In one example, the operations illustrated in FIG. 7 are performed, at least in part, by executing instructions 902a (stored in the memory 902) by the one or more processors 904 of the computing device 900 of FIG. 9. For example, the multi-layer network 110 may be trained on a first example of the computing device 900 and then deployed in the operating environment 162 on a second (different) example of the computing device 900. Operation 702 includes modeling the damage 130 in the target operating environment 132, for example with the damage modeling operation 124. Operation 704 includes modeling the computing device 900, for example producing the device model 126. Operation 706 includes generating the damage model 122, for example using the output of the damage modeling operation 124 and device model 126, if available.

Operation 708 includes providing the multi-layer network 110 comprising a plurality of nodes 200 arranged into a plurality of layers 202-210. In one example, the multi-layer network 110 comprises a neural network, and wherein the plurality of layers 202-210 comprises the input layer 202, the output layer 204, and at least one hidden layer 206. Operation 710 includes determining the shortcut connection 602 and 604. Thus, in one example, the multi-layer network 110 comprises at least one shortcut connection 602 among different ones of the plurality of layers 202-210. Operation 712 includes normalizing the weights of the multi-layer network 110 to accommodate the shortcut connections.

Operation 714 includes receiving the plurality of training cases 104 for training the multi-layer network 110. Operation 716 provides the training using each training case 106a-106c of the plurality of training cases 104 and encompasses operations 718-722. Operation 718 includes determining the set of dropout nodes 300 within the multi-layer network 110, based at least on the damage model 122 having a probability of a node being selected for dropout that is based at least on the target operating environment 132 of the multi-layer network 110, wherein the probability of a node being selected for dropout is spatially correlated. In one example, the damage model 122 comprises expected physical radiation damage 130 to the computing device 900 hosting the multi-layer network 110. In one example, the target operating environment 132 comprises at least one operating environment selected from the list consisting of: an aircraft and an earth-orbiting satellite. In one example, the target operating environment comprises 132 at least one operating environment selected from the list consisting of: a solar probe, a planetary probe, and a ground-based environment with expected radiation exposure. In one example, the damage model 122 comprises an expected physical layout of the nodes 200 of the multi-layer network 110 in a memory 902 of the computing device 900. In one example, the probability approximates an inverse Gaussian distribution. In one example, the damage model 122 comprises a network attack. In one example, at least one node within each hidden layer 206-210 is dropped out. In one example, at least one node within each layer 202-210 of the multi-layer network 110 is dropped out.

Operation 720 includes training the multi-layer network 110 with the determined set of dropout nodes 300 disabled, wherein a different set of dropout nodes 300 is determined for different training cases 106a-106c. Operation 722 includes normalizing the weights of the multi-layer network 110 to accommodate the dropped-out nodes. In one example, operation 722 is performed once after training is complete. Decision operation 724 determines whether additional training cases 106a-106c are to be used, and if so, the flow chart 700 returns to operation 716.

The multi-layer network 110 is deployed at 726 and begins operating in the target operating environment 132 in operation 728. Operation 728 encompasses operations 730 and 732. Operation 730 includes receiving the input data 136 by the multi-layer network 110. Operation 732 includes, based at least receiving the input data 136 by the multi-layer network 110, generating an output 144 by the multi-layer network 110. In one example, generating the output 144 comprises performing image classification. In one example, generating the output 144 comprises performing object recognition. When the computing device is damaged at 734, the multi-layer network 110 is able to continue operating.

When the flow chart 700 is performed for another multi-layer network 110, the operations include: providing a second multi-layer network 110 comprising a second plurality of nodes 200 arranged into a second plurality of layers 202-210; receiving a second plurality of training cases 104 for training the second multi-layer network 110; for each training case 106a, 106b, or 106c of the second plurality of training cases 104: determining a set of dropout nodes 300 within the second multi-layer network 110, based at least on a second damage model 122 having a probability that is based at least on a second target operating environment 132 of the second multi-layer network 110, wherein the probability of a node being selected for dropout is spatially correlated, and wherein the second target operating environment 132 of the second multi-layer network 110 is different than the target operating environment 132 of the multi-layer network 110; training the second multi-layer network 110 with the determined set of dropout nodes 300 disabled, wherein a different set of dropout nodes 300 is determined for different training cases 106a, 106b, or 106c; and operating the second multi-layer network 110 in the second target operating environment 132 by: receiving second input data 136 by the second multi-layer network 110; and based at least on receiving the second input data 136 by the second multi-layer network 110, generating a second output 144 by the second multi-layer network 110.

Figure 8:
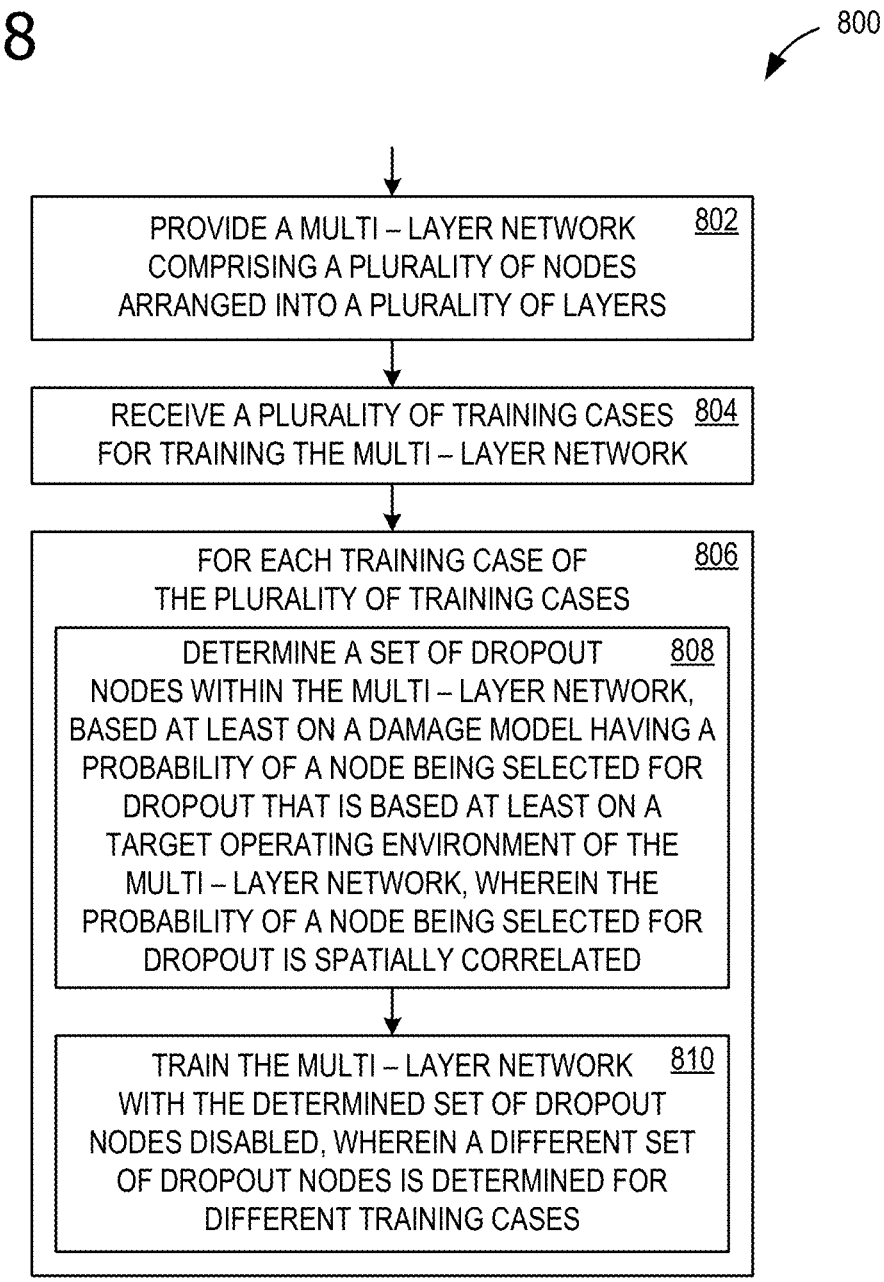
FIG. 8 is a flow chart 800 illustrating another method of mitigating damage to multi-layer networks, as may be used with the arrangement 100 of FIG. 1 in accordance with an example.

FIG. 8 shows a flow chart 800 illustrating a method of mitigating damage to multi-layer networks. In one example, operations illustrated in FIG. 8 are performed, at least in part, by executing instructions by the one or more processors 904 of the computing device 900 of FIG. 9. In one example, operation 802 includes providing a multi-layer network comprising a plurality of nodes arranged into a plurality of layers. Operation 804 includes receiving a plurality of training cases for training the multi-layer network. Operation 806 includes operations 808 and 810, which are performed for each training case of the plurality of training cases. Operation 808 includes determining a set of dropout nodes within the multi-layer network, based at least on a damage model having a probability of a node being selected for dropout that is based at least on a target operating environment of the multi-layer network, wherein the probability of a node being selected for dropout is spatially correlated. Operation 810 includes training the multi-layer network with the determined set of dropout nodes disabled, wherein a different set of dropout nodes is determined for different training cases.

Figure 9:
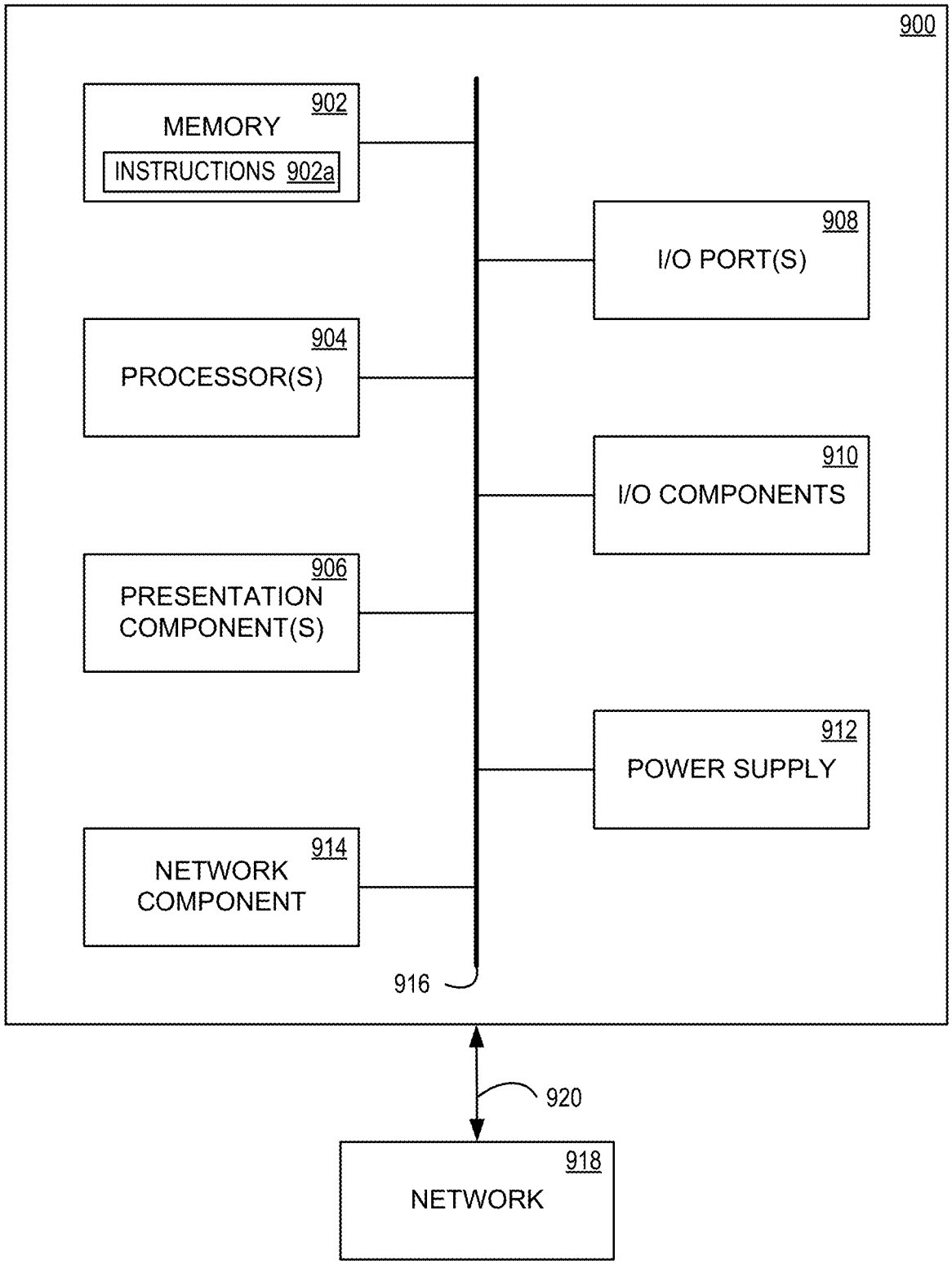
FIG. 9 is a block diagram of a computing device 900 suitable for implementing various aspects of the disclosure in accordance with an example.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902a configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flow charts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Implementations of the I/O components 1810 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some implementations blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
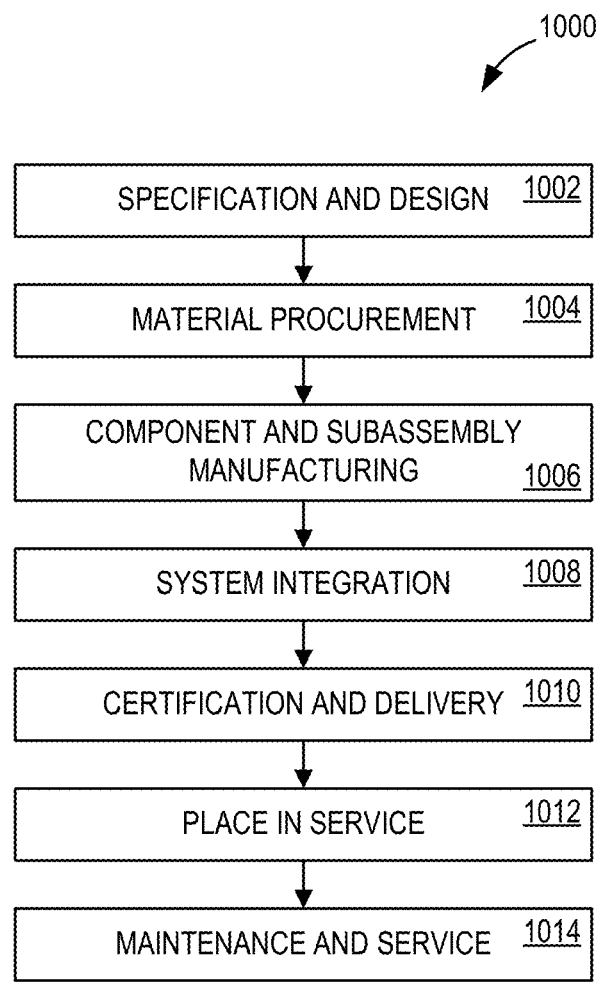
FIG. 10 is a block diagram of an apparatus production and service method 1000 that advantageously employs various aspects of the disclosure in accordance with an example.
Figure 11:
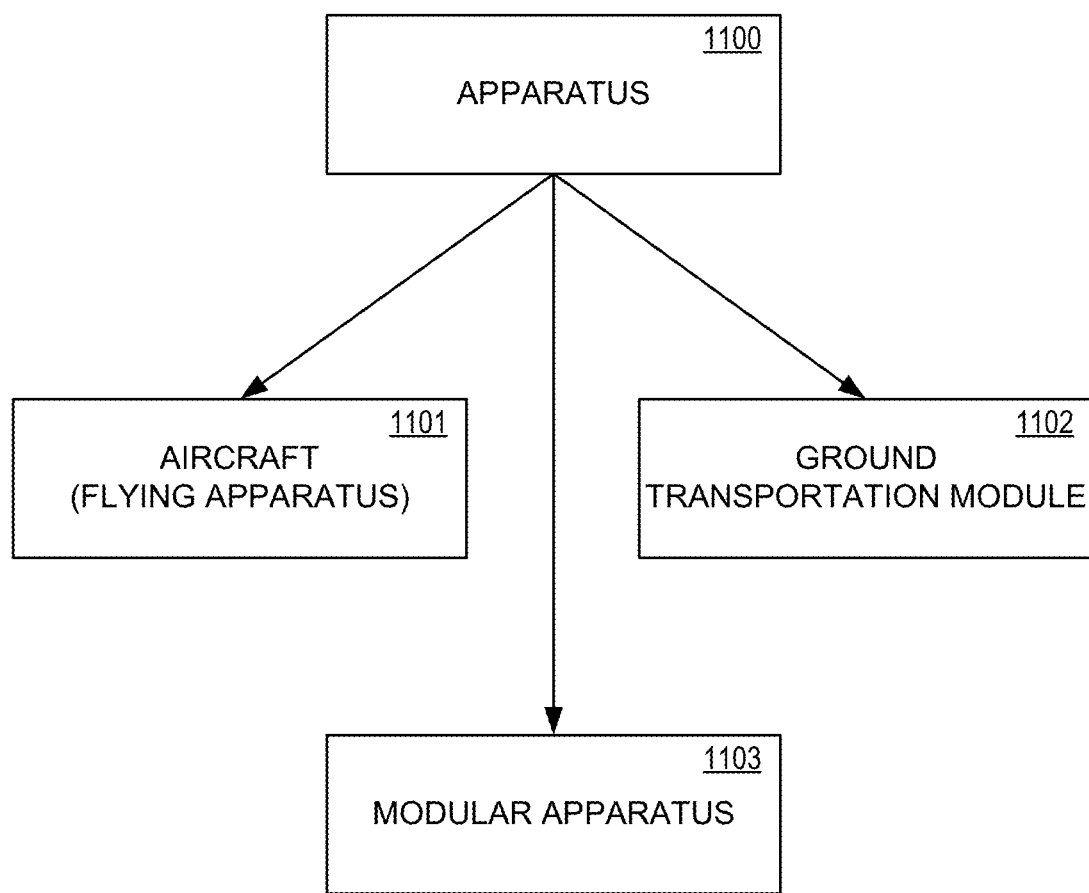
FIG. 11 is a block diagram of an apparatus 1100 for which various aspects of the disclosure may be advantageously employed in accordance with an example.
Figure 12:
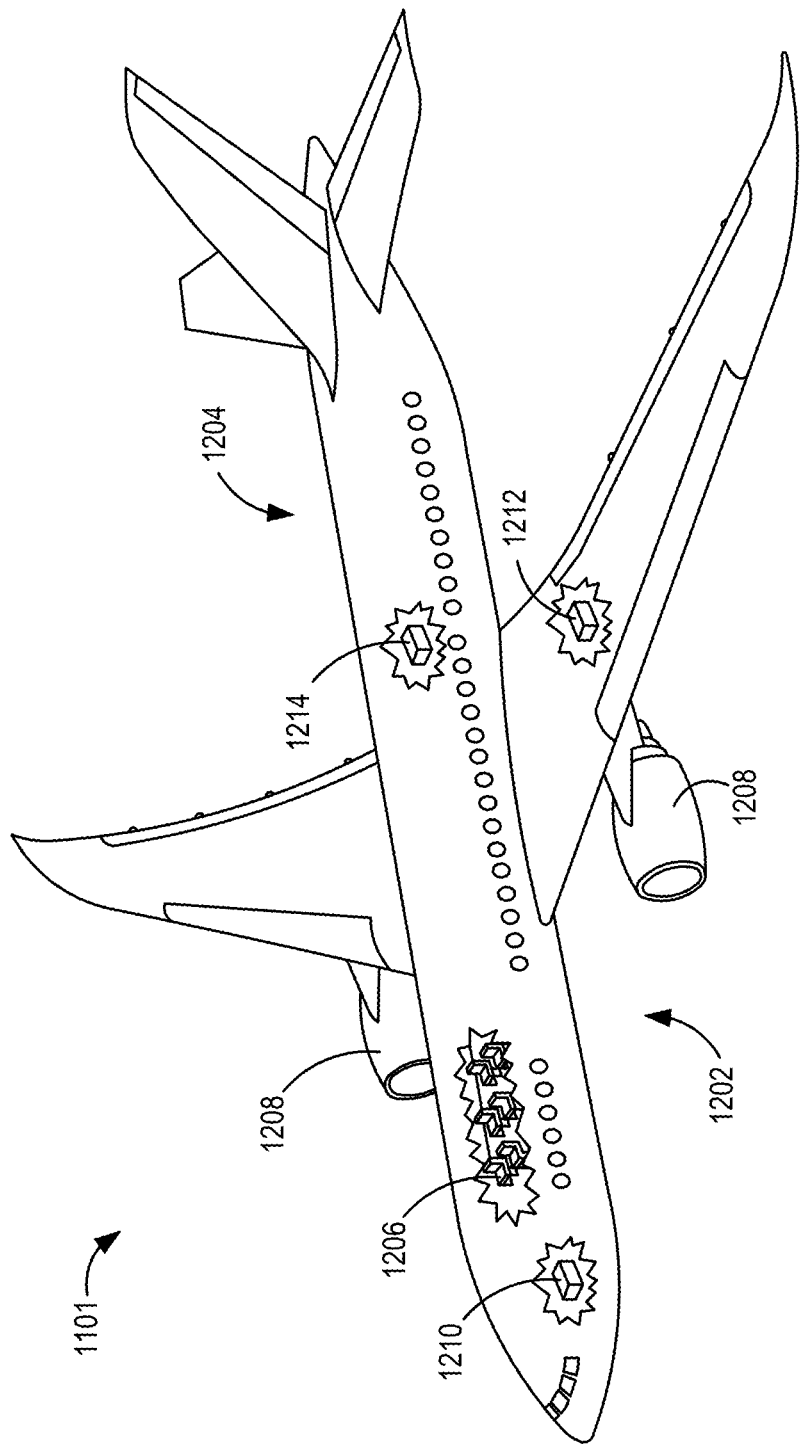
FIG. 12 is a schematic perspective view of a particular flying apparatus 1101 in accordance with an example.

Some examples of the disclosure are used in manufacturing and service applications as shown and described in relation to FIGS. 10-12. Thus, examples of the disclosure are described in the context of an apparatus of manufacturing and service method 1000 shown in FIG. 10 and apparatus 1100 shown in FIG. 11. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, satellite, planetary probe, deep space probe, solar probe, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of mitigating damage to multi-layer networks, the method comprising: providing a multi-layer network comprising a plurality of nodes arranged into a plurality of layers; receiving a plurality of training cases for the training multi-layer network; and for each training case of the plurality of training cases: determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases.

An example system for mitigating damage to multi-layer networks, the system comprising: one or more processors; and a memory storing instructions that, when executed by the one or more processors, cause the one or more processors to perform operations comprising: providing a multi-layer network comprising a plurality of nodes arranged into a plurality of layers; receiving a plurality of training cases for training the multi-layer network; and for each training case of the plurality of training cases: determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases.

An example computer program product, comprising a computer usable medium having a computer readable program code embodied therein, the computer readable program code adapted to be executed to implement a method for mitigating damage to multi-layer networks, the method comprising: providing a multi-layer network comprising a plurality of nodes arranged into a plurality of layers; receiving a plurality of training cases for training the multi-layer network; and for each training case of the plurality of training cases: determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases.

Alternatively, or in addition to the other examples described herein, examples include any combination of the following:
   the multi-layer network comprises a neural network, and wherein the plurality of layers comprises an input layer, an output layer, and at least one hidden layer;
   the multi-layer network comprises at least one shortcut connection among different ones of the plurality of layers;
   the damage model comprises expected physical radiation damage to a computing device hosting the multi-layer network;

the damage model comprises damage to a computing device hosting the multi-layer network, the damage of a type selected from the list consisting of: radiation damage, virus, and cyber-attack;
operating the multi-layer network in the target operating environment by: receiving input data by the multi-layer network; and based at least receiving input data by the multi-layer network, generating an output by the multi-layer network;
the probability approximates an inverse Gaussian distribution;
the target operating environment comprises at least one operating environment selected from the list consisting of: a spacecraft, an aircraft and an earth-orbiting satellite;
at least one node within each layer of the multi-layer network is dropped out;
at least one node within each hidden layer is dropped out;
providing a second multi-layer network comprising a second plurality of nodes arranged into a second plurality of layers;
receiving a second plurality of training cases for training the second multi-layer network;
for each training case of the second plurality of training cases: determining a set of dropout nodes within the second multi-layer network, based at least on a second damage model having a probability that is based at least on a second target operating environment of the second multi-layer network, wherein the probability of a node being selected for dropout is spatially correlated, and wherein the second target operating environment of the second multi-layer network is different than the target operating environment of the multi-layer network; and training the second multi-layer network with the determined set of dropout nodes disabled, wherein a different set of dropout nodes is determined for different training cases; and operating the second multi-layer network in the second target operating environment by: receiving second input data by the second multi-layer network; and based at least on receiving the second input data by the second multi-layer network, generating a second output by the second multi-layer network;
the damage model comprises an expected physical layout of the nodes of the multi-layer network in a memory of the computing device;
the damage model comprises a network attack;
generating the output comprises performing image classification;
generating the output comprises performing object recognition; and
the target operating environment comprises at least one operating environment selected from the list consisting of: a solar probe, a planetary probe, and a ground-based environment with expected radiation exposure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of mitigating damage to multi-layer networks, the method comprising:
providing a multi-layer network comprising a plurality of nodes arranged into a plurality of layers;
receiving a plurality of training cases for training the multi-layer network; and
for each training case of the plurality of training cases:
determining a set of dropout nodes within the multi-layer network, based at least on a damage model having a probability of a node being selected for dropout that is based at least on a target operating environment of the multi-layer network, wherein the probability of a node being selected for dropout is spatially correlated; and
training the multi-layer network with the determined set of dropout nodes disabled, wherein a different set of dropout nodes is determined for different training cases.

2. The method of claim 1, wherein the multi-layer network comprises a neural network, and wherein the plurality of layers comprises an input layer, an output layer, and at least one hidden layer.

3. The method of claim 1, wherein the multi-layer network comprises at least one shortcut connection among different ones of the plurality of layers.

4. The method of claim 1, wherein the damage model comprises damage to a computing device hosting the multi-layer network, the damage of a type selected from a list consisting of:
radiation damage, virus, and cyber-attack.

5. The method of claim 1, further comprising:
operating the multi-layer network in the target operating environment by:
receiving input data by the multi-layer network; and
based at least on receiving input data by the multi-layer network, generating an output by the multi-layer network.

6. The method of claim 1, wherein the probability approximates an inverse Gaussian distribution.

7. The method of claim 1, wherein the target operating environment comprises at least one operating environment selected from a list consisting of:
a spacecraft, an aircraft, and an earth-orbiting satellite.

8. A system for mitigating damage to multi-layer networks, the system comprising:
one or more processors; and
a memory storing instructions that, when executed by the one or more processors, cause the one or more processors to perform operations comprising:
providing a multi-layer network comprising a plurality of nodes arranged into a plurality of layers;
receiving a plurality of training cases for training the multi-layer network; and
for each training case of the plurality of training cases:
determining a set of dropout nodes within the multi-layer network, based at least on a damage model having a probability of a node being selected for dropout that is based at least on a target operating environment of the multi-layer network, wherein the probability of a node being selected for dropout is spatially correlated; and training the multi-layer network with the determined set of dropout nodes disabled, wherein a different set of dropout nodes is determined for different training cases.

9. The system of claim 8, wherein the multi-layer network comprises a neural network, and wherein the plurality of layers comprises an input layer, an output layer, and at least one hidden layer.

10. The system of claim 8, wherein the multi-layer network comprises at least one shortcut connection among different ones of the plurality of layers.

11. The system of claim 8, wherein the damage model comprises damage to a computing device hosting the multi-layer network, the damage of a type selected from a list consisting of:

radiation damage, virus, and cyber-attack.

12. The system of claim 8, wherein the operations further comprise:

operating the multi-layer network in the target operating environment by:
receiving input data by the multi-layer network; and
based at least on receiving input data by the multi-layer network, generating an output by the multi-layer network.

13. The system of claim 8, wherein the probability approximates an inverse Gaussian distribution.

14. The system of claim 8, wherein the target operating environment comprises at least one operating environment selected from a list consisting of:

a spacecraft, an aircraft, and an earth-orbiting satellite.

15. A computer program product, comprising a computer storage medium having a computer readable program code embodied therein, the computer readable program code adapted to be executed to implement a method for mitigating damage to multi-layer networks, the method comprising:

providing a multi-layer network comprising a plurality of nodes arranged into a plurality of layers;

receiving a plurality of training cases for training the multi-layer network; and for each training case of the plurality of training cases:
determining a set of dropout nodes within the multi-layer network, based at least on a damage model having a probability of a node being selected for dropout that is based at least on a target operating environment of the multi-layer network, wherein the probability of a node being selected for dropout is spatially correlated; and
training the multi-layer network with the determined set of dropout nodes disabled, wherein a different set of dropout nodes is determined for different training cases.

16. The computer program product of claim 15, wherein the multi-layer network comprises a neural network, and wherein the plurality of layers comprises an input layer, an output layer, and at least one hidden layer.

17. The computer program product of claim 15, wherein the multi-layer network comprises at least one shortcut connection among different ones of the plurality of layers.

18. The computer program product of claim 15, wherein the damage model comprises damage to a computing device hosting the multi-layer network, the damage of a type selected from a list consisting of:

radiation damage, virus, and cyber-attack.

19. The computer program product of claim 15, wherein the method further comprises:

operating the multi-layer network in the target operating environment by:
receiving input data by the multi-layer network; and
based at least on receiving input data by the multi-layer network, generating an output by the multi-layer network.

20. The computer program product of claim 15, wherein the probability approximates an inverse Gaussian distribution.

* * * * *